US009292768B2

(12) United States Patent
Kajihara et al.

(10) Patent No.: US 9,292,768 B2
(45) Date of Patent: Mar. 22, 2016

(54) METHOD OF GENERATING LABEL DATA FOR PRINTING IMAGES THAT ARE LARGER THAN A TAPE WIDTH OF A TAPE-SHAPED MEMBER, RECORDING MEDIUM, LABEL DATA GENERATING APPARATUS, AND LABEL CREATING SYSTEM

(71) Applicant: Seiko Epson Corporation, Tokyo (JP)

(72) Inventors: Mikihiro Kajihara, Suwa (JP); Akinori Tsuji, Suwa (JP); Minoru Kasahara, Tokyo (JP); Junpei Watanabe, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/249,878

(22) Filed: Apr. 10, 2014

(65) Prior Publication Data
US 2014/0307273 A1 Oct. 16, 2014

(30) Foreign Application Priority Data

Apr. 12, 2013 (JP) ................................. 2013-083997

(51) Int. Cl.
G06K 15/02 (2006.01)
B41J 3/407 (2006.01)
G06F 3/12 (2006.01)
G06K 17/00 (2006.01)

(52) U.S. Cl.
CPC ............. *G06K 15/024* (2013.01); *B41J 3/4075* (2013.01); *G06F 3/12* (2013.01); *G06K 2017/0083* (2013.01)

(58) Field of Classification Search
CPC ............. G06K 15/024; G06K 15/022; G06K 2017/0083
See application file for complete search history.

(56) References Cited

U.S. PATENT DOCUMENTS

| 5,795,086 | A | * | 8/1998 | Watanabe et al. ........... 400/615.2 |
| 6,050,734 | A | * | 4/2000 | Watanabe et al. ........... 400/615.2 |
| 6,081,618 | A | * | 6/2000 | Naoi et al. ..................... 382/180 |
| 6,089,771 | A | * | 7/2000 | Watanabe .............. B41J 3/4075 400/61 |

(Continued)

FOREIGN PATENT DOCUMENTS

| JP | 11-157136 | 6/1999 |
| JP | 2006-268388 | 10/2006 |

OTHER PUBLICATIONS

King Jim Co. Ltd, "Tepra Pro PC Label Soft SPC9C Instruction Manual," Nov. 2012. vol. 11, p. 68 and 81.

Primary Examiner — Nicholas Pachol
(74) Attorney, Agent, or Firm — ALG Intellectual Property, LLC

(57) ABSTRACT

Provided is a label data generating method of generating label data to create a label by printing a printing image on a tape-shaped member, the method comprising: setting sequential printing for creating the labels by printing a plurality of types of printing images based on each item of individual information which is sequentially read from an information list including the plurality of items of individual information; setting the number of printed copies; and generating the label data so that a plurality of copies of the labels are created, wherein in the generating of the label data, the label data is generated so that the label data creating apparatus performs non-sequential printing that prints the plurality of types of printing images respectively printed for a plurality of copies by the sequential printing in a sequence in which the same printing images are collected for a plurality of copies.

4 Claims, 13 Drawing Sheets

(56) References Cited

U.S. PATENT DOCUMENTS

| | | | |
|---|---|---|---|
| 6,134,016 A * | 10/2000 | Watanabe et al. | 358/1.1 |
| 6,587,216 B1 * | 7/2003 | Yamada | G06K 15/022 358/1.11 |
| 7,318,681 B2 * | 1/2008 | Kato | B41J 3/4075 400/615.2 |
| 2002/0075502 A1 * | 6/2002 | Hayama | G06K 15/02 358/1.15 |
| 2004/0109053 A1 * | 6/2004 | Ray | 347/101 |
| 2005/0057761 A1 * | 3/2005 | Sakai | B41J 3/4075 358/1.2 |
| 2005/0182678 A1 * | 8/2005 | Walker et al. | 705/14 |
| 2005/0271444 A1 * | 12/2005 | Ueno et al. | 400/613.1 |
| 2006/0222431 A1 * | 10/2006 | Kato | B41J 3/4075 400/621 |
| 2007/0146474 A1 * | 6/2007 | Kameda et al. | 347/262 |
| 2009/0046324 A1 * | 2/2009 | Lee et al. | 358/1.18 |
| 2011/0222946 A1 * | 9/2011 | Murayama | 400/76 |
| 2011/0236110 A1 * | 9/2011 | Murayama | 400/582 |
| 2014/0048599 A1 * | 2/2014 | Peters | 235/385 |
| 2014/0153004 A1 * | 6/2014 | Tufano | 358/1.2 |

\* cited by examiner

F I G. 1
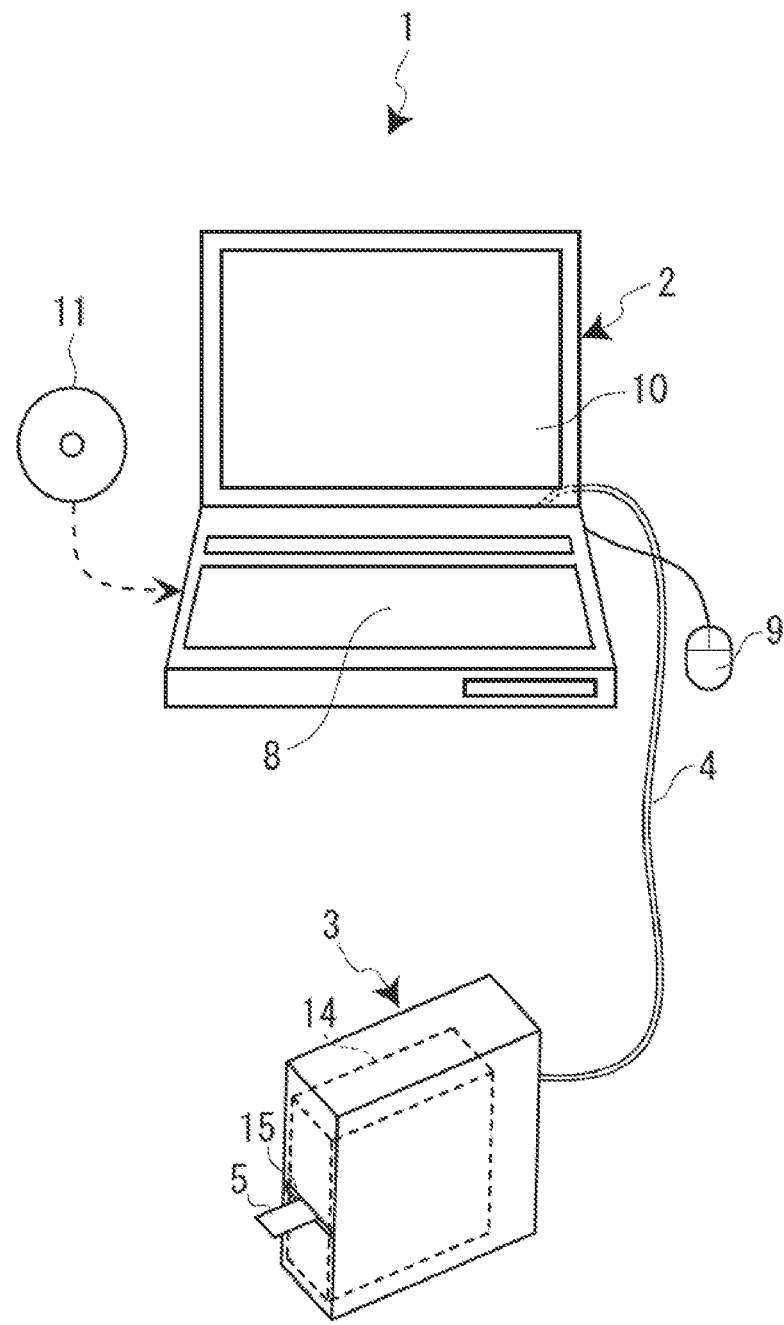

METHOD OF GENERATING LABEL DATA FOR PRINTING IMAGES THAT ARE LARGER THAN A TAPE WIDTH OF A TAPE-SHAPED MEMBER, RECORDING MEDIUM, LABEL DATA GENERATING APPARATUS, AND LABEL CREATING SYSTEM

CROSS REFERENCES TO RELATED APPLICATIONS

The entire disclosure of Japanese Patent Application No. 2013-083997, filed Apr. 12, 2013 is expressly incorporated by reference herein.

BACKGROUND

1. Technical Field

The present invention relates to a label data generating method, a recording medium, a label data generating apparatus, and a label creating system for generating label data supplied to a label creating apparatus that creates labels by printing a printing image on a tape-shaped member and cutting out a printed portion.

2. Related Art

In the related art, it is known that a label creating apparatus generates label data and enables match printing (enlarged printing) that prints printing images larger than a tape width of a tape-shaped member on the tape-shaped member by dividing the printing image in a tape width direction into divided printing images (see JP-A-11-157136). In the match printing, if a plurality of copies are printed, the user selects whether to perform sequential match printing that performs printing in a sequence in which a series of divided printing images are collected, or non-sequential printing that performs printing in a sequence in which the same divided printing images are collected for a plurality of copies, and the label data is generated based on the selection result. Further, it is known that a label creating apparatus generates label data so that the sequential printing that prints printing images based on each item of individual information sequentially read from an information list obtained from a plurality of items of individual information is performed (see JP-A-2006-268388).

SUMMARY

However, in the related art, when each item of individual information is printed for a plurality of copies by sequential printing, label data can only be generated so that sequential printing that performs printing in a sequence in which a plurality of types of printing images are collected is performed, but label data cannot be generated so that non-sequential printing that performs printing in a sequence in which the same printing images are collected is performed. Accordingly, if labels printed by sequential printing in a sequence in which the same printing images are collected are obtained, it is required that the user rearrange an order in person after the labels are created.

An advantage of some aspects of the invention is to provide a label data generating method, a recording medium, a label data generating apparatus, and a label creating system that can obtain labels printed by sequential printing in a sequence in which the same printing images are collected.

According to an aspect of the invention, there is provided a label data generating method of generating label data for a label creating apparatus to create a label by printing a printing image on a tape-shaped member based on the label data, the method including: setting sequential printing for creating the labels by printing a plurality of types of printing images based on each item of individual information which is sequentially read from an information list including the plurality of items of individual information; setting the number of printed copies; and generating the label data so that a plurality of copies of the labels on which a plurality of types of printing images are printed are created, in which in the setting of the sequential printing, the label data is generated so that the label data creating apparatus performs non-sequential printing that prints the plurality of types of printing images respectively printed for a plurality of copies by the sequential printing in a sequence in which the same printing images are collected for a plurality of copies.

According to another aspect of the invention, there is provided a label data generating apparatus that generates label data in order to generate a label by printing a printing image on a tape-shaped member based on the label data, the label data generating apparatus including: a printing setting unit that sets sequential printing for creating the labels by printing the plurality of types of printing images based on each item of individual information sequentially read from an information list including the plurality of items of individual information; a number-of-printed-copies setting unit that sets the number of printed copies; and a data generating unit that generates the label data so that a plurality of copies of the labels on which a plurality of types of printing images are printed are created, in which the data generating unit generates the label data so that the label creating apparatus performs non-sequential printing that prints the plurality of types of printing images respectively printed for a plurality of copies by the sequential printing in a sequence in which the same printing images are collected for a plurality of copies.

According to the configuration as described above, the label data is generated so that a label creating apparatus performs non-sequential printing that prints a plurality of types of printing images respectively printed for a plurality of copies by sequential printing in a sequence in which the same printing images are collected for a plurality of copies. Therefore, labels printed by sequential printing in a sequence in which the same printing images are collected can be obtained.

In the label data generating method described above, in the setting of the sequential printing, it is preferable that match printing that prints the printing images larger than a tape width of the tape-shaped member on the tape-shaped member by dividing the printing images in a tape width direction into a plurality of divided printing images is set, and in the generating of the label data, the label data is generated so that the labels in which the plurality of types of printing images are divided into the plurality of divided printing images are created in a sequence in which the same printing images are collected for a plurality of copies.

According to the configuration described above, when sequential printing is set and match printing is set in the setting of the sequential printing, labels printed by sequential printing in a sequence in which the same printing images are collected can be obtained.

In this case, it is preferable to further include setting whether to perform the non-sequential printing or the sequential printing that performs printing in a sequence in which the plurality of types of printing images are collected with respect to the plurality of types of printing images printed for a plurality of copies, and setting whether to perform sequential match printing that performs printing in a sequence in which the plurality of divided printing images are collected or to perform non-sequential match printing that performs printing in a sequence in which the same divided printing images are collected for a plurality of copies with respect to the plurality of divided printing images printed for a plurality of copies by match printing, in which in the generating of the label data, the label data is generated based on the setting result in the setting of whether to perform the non-sequential printing or the sequential printing is generated so that the label creating apparatus performs at least one printing process of a first printing process that performs the sequential printing and the sequential match printing, a second printing process that performs the non-sequential printing and the sequential match printing, a third printing process that performs the sequential printing and the non-sequential match printing, and a fourth printing process that performs the non-sequential printing and the non-sequential match printing.

According to the configuration described above, the label data can be generated so that the label creating apparatus performs one of the first to fourth printing processes based on the setting result by setting any one of the sequential match printing and the non-sequential match printing together with setting any one of sequential printing and non-sequential printing in the setting of whether to perform the non-sequential printing or the sequential printing. Therefore, according to the occasion, any of the sequential printing and the non-sequential printing can be set, any of the sequential match printing and the non-sequential match printing can be set, and labels printed in a sequence corresponding to the setting result can be obtained.

In this case, it is preferable to further include a display step of displaying four types of printing images that respectively correspond to the first to fourth printing processes based on the setting result in the setting of whether to perform the non-sequential printing or the sequential printing and display sequences in which the labels are printed, on a display unit.

According to the configuration described above, four types of sequence screens respectively corresponding to the first to fourth printing processes based on the setting result in the setting of whether to perform the non-sequential printing or the sequential printing are displayed on a display unit. According to this, the user can easily recognize in which sequence the labels are printed based on the setting result in the setting of whether to perform the non-sequential printing or the sequential printing.

According to still another aspect of the invention, there is provided a program causing a computer provided with a label data generating apparatus that generates label data to execute each step according to the label data generating method described above.

According to the configuration described above, the label data generating apparatus generates label data so that the label creating apparatus performs non-sequential printing that prints a plurality of types of printing images respectively printed for a plurality of copies by the sequential printing, in a sequence in which the same printing images are collected for a plurality of copies. Therefore, labels printed by sequential printing in a sequence in which the same printing images are collected can be obtained.

According to still another aspect of the invention, there is provided a label creating system including the label data generating apparatus and the label creating apparatus.

According to the configuration described above, by including the label data generating apparatus described above, non-sequential printing that prints a plurality of types of printing images respectively printed for a plurality of copies by sequential printing in a sequence in which the same printing images are collected for a plurality of copies is performed. Therefore, labels printed by sequential printing in a sequence in which the same printing images are collected can be obtained.

BRIEF DESCRIPTION OF THE DRAWINGS

The invention will be described with reference to the accompanying drawings, wherein like numbers reference like elements.

FIG. 1 is a diagram illustrating a configuration of a label creating system according to an embodiment of the invention.

DESCRIPTION OF EXEMPLARY EMBODIMENTS

Figure 2:
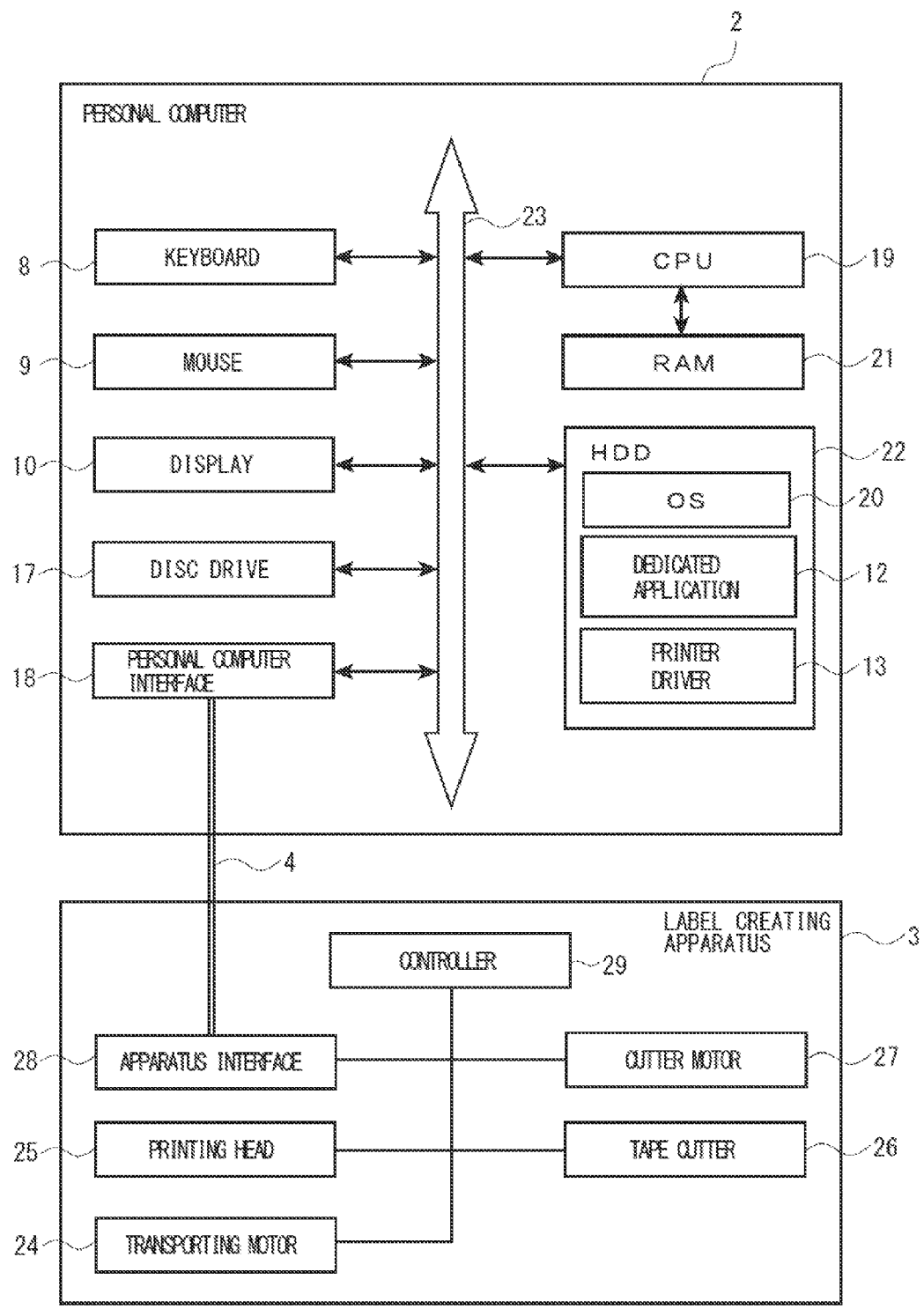
FIG. 2 is a block diagram illustrating a control configuration of the label creating system.

Hereinafter, a label data generating method, a program, a label data generating apparatus, and a label creating system according to an embodiment of the invention are described with reference to the accompanying drawings.

FIG. 1 is a diagram illustrating a configuration of a label creating system according to an embodiment of the invention.

As illustrated in FIG. 1, the label creating system 1 according to the embodiment includes a personal computer 2 which is a label data generating apparatus, and a label creating apparatus 3. The personal computer 2 and the label creating apparatus 3 are connected via a cable 4. Of course, the personal computer 2 and the label creating apparatus 3 can be connected wirelessly or via a network (the Internet or local area network).

In the label creating system 1, the personal computer 2 transmits label data generated based on an input from a user to the label creating apparatus 3. Further, the label creating apparatus 3 prints the label data received from the personal computer 2 on a tape-shaped member 5, and creates a label L by cutting out a printed portion (see FIGS. 4A and 4B and the like).

The personal computer 2 is a general personal computer that includes a keyboard 8, a mouse 9, a display 10, and the like, and a dedicated application 12 and a printer driver 13 (label data generating program) stored in a recording medium such as a CD-ROM 11 are installed on the personal computer 2 (see FIG. 2). Further, the dedicated application 12 and the printer driver 13 can be downloaded from a certain server (web site).

A cartridge 14 is detachably mounted on the label creating apparatus 3. The cartridge 14 is configured with the tape-shaped member 5, an ink ribbon (not illustrated), a platen roller, and a cartridge casing that accommodates the tape-shaped member 5, the ink ribbon, and the platen roller. The label creating apparatus 3 feeds the tape-shaped member 5 from the cartridge 14 to a tape discharging opening 15 based on the label data received from the personal computer 2, and performs a printing process. The printed portion of the tape-shaped member 5 is cut out by a tape cutter 26 (see FIG. 2) provided in front of the tape discharging opening 15. The cut-out tape piece becomes the label L. In addition, the tape-shaped member 5 is, for example, an adhesive tape with a release paper.

FIG. 2 is a block diagram illustrating a control configuration of the label creating system.

Subsequently, the control configuration of the label creating system 1 is described with reference to FIG. 2. The personal computer 2 includes a disc drive 17, a personal computer interface 18, a Central Processing Unit (CPU) 19, a Random Access Memory (RAM) 21, a Hard Disc Drive (HDD) 22, and a connecting bus 23 that connects each component, in addition to the keyboard 8, the mouse 9, and the display 10 (display unit).

The disc drive 17 reads data stored in the CD-ROM 11, and used for installing the dedicated application 12 and the printer driver 13. The personal computer interface 18 is configured with, for example, a Universal Serial Bus (USB) interface, and can be used for transmitting and receiving various commands, statuses, and the like together with transmitting the generated label data to the label creating apparatus 3.

The CPU 19 controls the entire personal computer 2 by various types of data calculation processes. The RAM 21 can be used as a work area when the CPU 19 performs various calculation processes.

The HDD 22 stores the dedicated application 12 and the printer driver 13 read from the CD-ROM 11 in addition to an Operating System (OS) 20. The dedicated application 12 is a text editor that edits a printing image printed by the label creating apparatus 3, and enables the user to input and edit operations on an editing screen 32 described below. The printer driver 13 (data generating unit) generates label data based on an editing result obtained from the editing screen 32, a setting result such as the number of printed copies and the like obtained from a printing dialogue 36 as described below.

Meanwhile, the label creating apparatus 3 includes a transporting motor 24, a printing head 25, a tape cutter 26, a cutter motor 27, an apparatus interface 28, and a controller 29.

The transporting motor 24 is driven to rotate a platen roller of the mounted cartridge 14. The printing head 25 is a thermal type head. The printing head 25 and the platen roller cooperate to feed and transport the tape-shaped member 5 and the ink ribbon which are interposed between the printing head 25 and the platen roller and to perform printing on the tape-shaped member 5. The tape cutter 26 cuts the transported tape-shaped member 5 in a tape width direction. The cutter motor 27 causes the tape cutter 26 to perform a cutting operation.

The apparatus interface 28 is configured with a USB interface and the like, and is used for transmitting various commands, statuses, and the like together with receiving label data transmitted from the personal computer 2.

The controller 29 includes a CPU, a Read Only Memory (ROM), a RAM, and the like, and controls each element of the label creating apparatus 3. In the ROM, control programs and control information are stored so that the CPU can perform various types of control. The control programs include analysis programs that analyze label data transmitted from the personal computer 2, and printing and cutting process programs that perform a printing process and a cutting process, and the like.

In the label creating system 1 configured as described above, if the user edits a printing image on the editing screen 32 displayed on the display 10 of the personal computer 2, and the like and sets the number of printed copies in the printing dialogue 36, and then instructs execution of the printing process, the printer driver 13 generates label data and the generated label data is transmitted from the personal computer interface 18 in the personal computer 2. In the label creating apparatus 3, the controller 29 performs control so that the transporting motor 24 and the printing head 25 are driven based on the received label data. According to this, the platen roller and the printing head 25 cooperate to feed and transport the tape-shaped member 5 from the cartridge 14 and to perform printing on the tape-shaped member 5. Further, the controller 29 performs control so that the cutter motor 27 is driven based on the label data. According to this, the tape cutter 26 can cut out the printed portion of the transported tape-shaped member 5. In this manner, the label creating apparatus 3 creates the label L on which a desired printing image is printed.

Subsequently, sequential printing performed by the label creating system 1 is described. The sequential printing is creating the labels L by printing a plurality of types of printing images based on respective items of individual information sequentially read from an information list 31 including the plurality of types of individual information. The sequential printing is so-called pouring printing.

Figure 3:
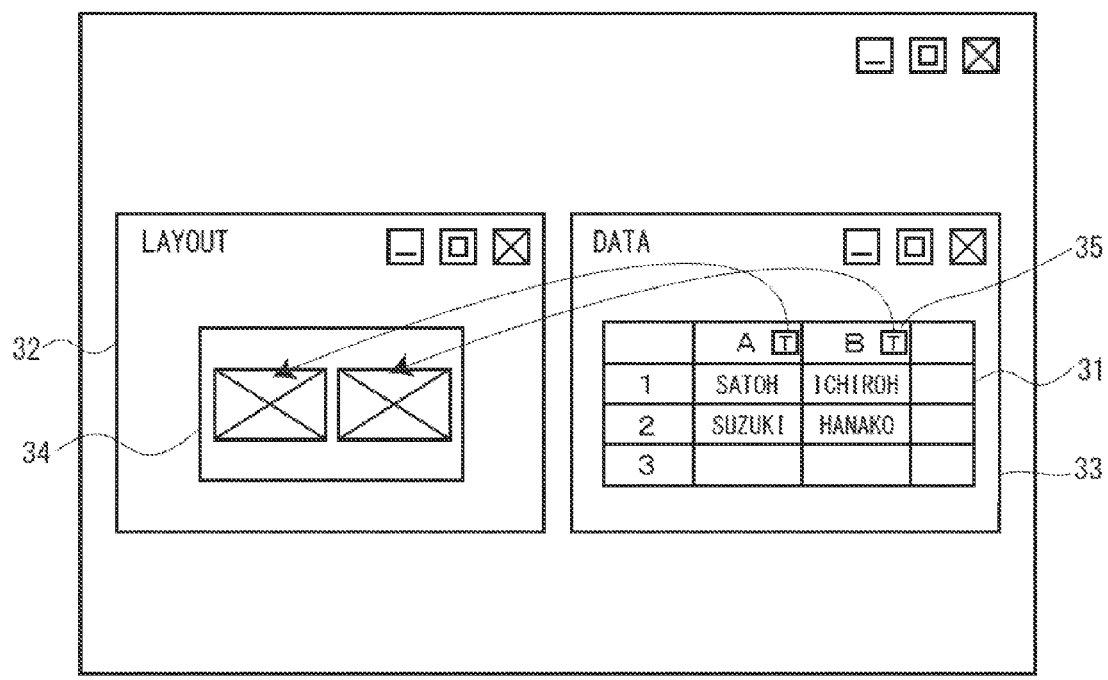
FIG. 3 is a diagram illustrating an editing screen and a data creating screen displayed on a display of a personal computer included in the label creating system.
Figure 4A:
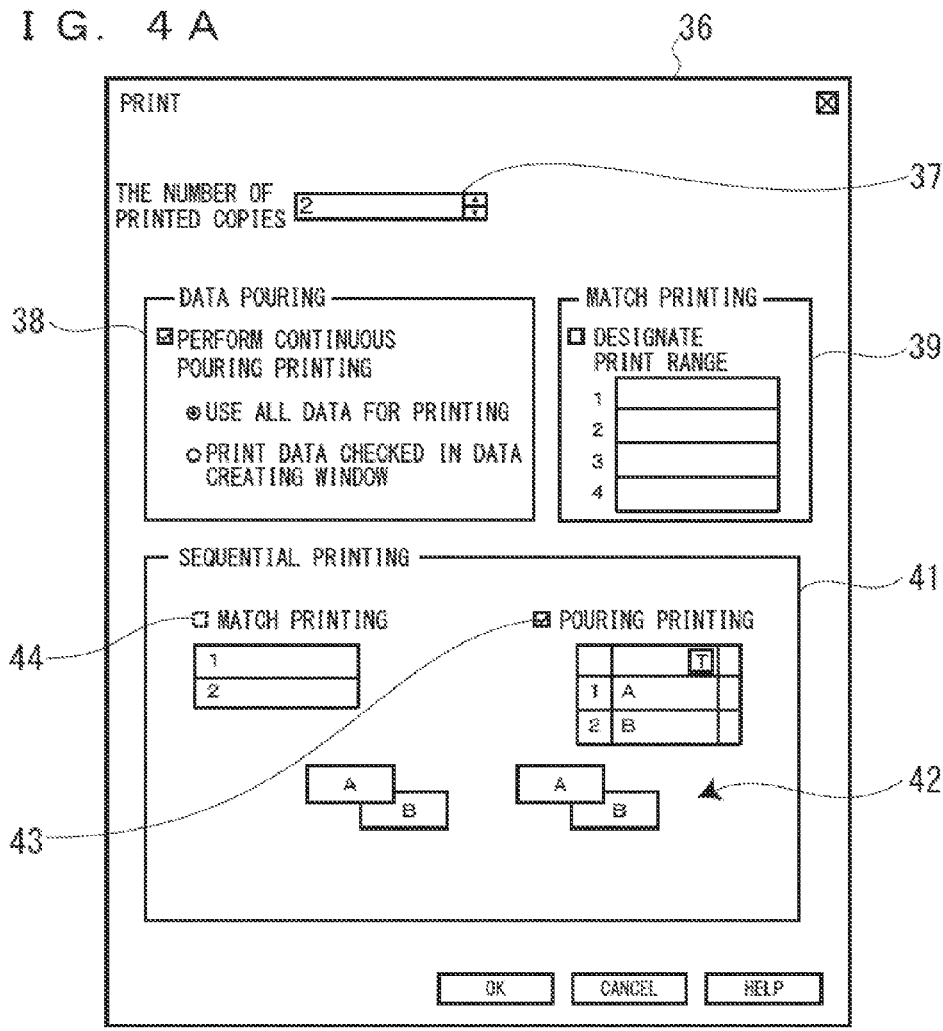
FIG. 4A is a diagram illustrating a state in which sequential printing is set in a printing dialogue displayed on the display and FIG. 4B is a diagram illustrating a sequence of labels created based on the setting in the printing dialogue.
Figure 4B:
Figure 5A:
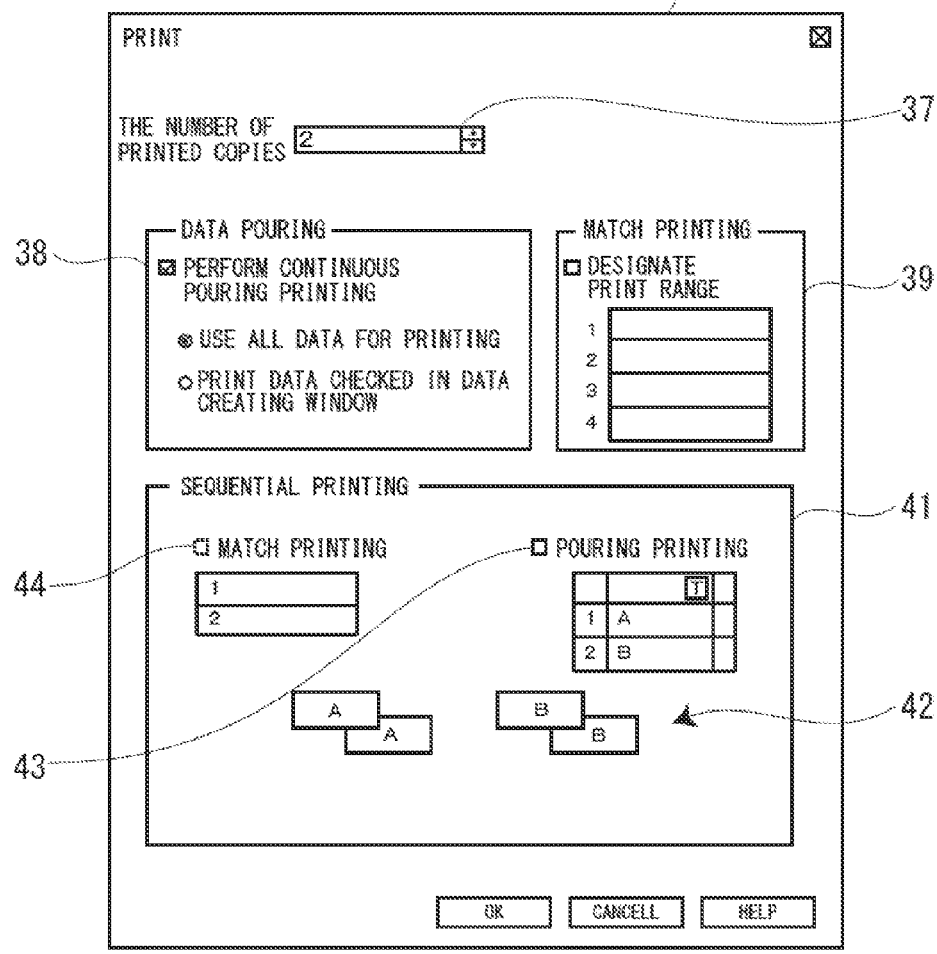
FIG. 5A is a diagram illustrating a state in which non-sequential printing is set in a printing dialogue and FIG. 5B is a diagram illustrating a sequence of labels created based on the setting in the printing dialogue.
Figure 5B:

FIG. 3 is a diagram illustrating an editing screen and a data generating screen displayed on the display of the personal computer included in the label creating system. FIG. 4A is a diagram illustrating a state in which sequential printing is set in a printing dialogue displayed on the display. Further, FIG. 4B is a diagram illustrating a sequence of labels created based on the setting in the printing dialogue illustrated in FIG. 4A. FIG. 5A is a diagram illustrating a state in which non-sequential printing is set in the printing dialogue. Further, FIG. 5B is a diagram illustrating a sequence of labels created based on the setting in the printing dialogue illustrated in FIG. 5A.

With reference to FIGS. 3 to 5B, description is made in a case in which the label creating apparatus 3 performs sequential printing, and a plurality of copies of labels L are created for each of the plurality of types of printing images. Here, based on the information list 31 including names (two items of identification information) of two people, two copies of the labels L on which each name of each person is printed are created.

First, the editing screen 32 and a data creating screen 33 are displayed on the display 10 of the personal computer 2 based on a predetermined operation from the user (see FIG. 3). A label image 34 or the like which is an image of the label L is displayed on the editing screen 32. The information list 31 for printing (pouring) is displayed on the data creating screen 33. The user inputs individual information (name) on the data creating screen 33 and creates the information list 31. Each item of the individual information of the information list 31 is configured with a column A to which "last names" are input and a column B to which "first names" are input. In addition, data created in another application can be used.

Subsequently, the user drags an icon (column icon 35) of a column to be poured into the labels L among the columns A and B included in the information list 31, and moves the icon to a certain position in the label image 34 displayed on the editing screen 32. According to this, the individual information in each column of the information list 31 is poured into the position to which the column icon 35 is moved. According to this, individual information on each column of the information list 31 is poured into the position to which the column icon 35 is moved.

Subsequently, if the user performs a predetermined operation (for example, clicks a print icon), the printing dialogue 36 is displayed on the display 10 (see FIG. 4A). The printing dialogue 36 includes a number-of-printed-copies setting area 37 that sets the number of printed copies, a sequential printing setting area 38 that performs setting for sequential printing, a match printing setting area 39 that performs setting for match printing, and a sequential printing setting area 41 that performs setting for sequential printing and sequential match printing as described below. In addition, a sequence image 42 presenting a sequence in which the labels L are printed in response to states of a pouring box 43 and a matching box 44 as described below is selectively displayed on the sequential printing setting area 41.

The sequential printing setting area 38 includes a check box that sets whether to perform sequential printing based on the information list displayed on the data creating screen 33 and selection buttons that set whether to print all candidates of the information list 31 or to print only candidates selected from the data creating screen 33 in the case of the sequential printing. Further, the match printing setting area 39 includes a check box and selection boxes that perform setting in the case of printing only a part of divided images when the match printing is performed. For example, when only the upper divided image obtained by dividing an image into two is printed, the check box is set to be a checked state and a button "1" may be selected.

Here, in order to print two copies of respective items of individual information (name of each person), the number of printed copies in the number-of-printed-copies setting area 37 is set to "2". If the number of printed copies is set to be equal to or more than "2", the check box for "pouring" (the pouring box 43) in the sequential printing setting area 41 is activated for checking. Further, at this point, since the match printing is not set, the check box for "the match printing" (the matching box 44) is in a grayed-out state (illustrated with a dashed line in the drawing).

If the user performs checking on the pouring box 43, the sequence image 42 corresponding to sequential printing is displayed on the sequential printing setting area 41. Accordingly, if the user clicks "OK" to perform instruction for the printing execution, the printer driver 13 creates label data so that the label creating apparatus 3 performs sequential printing. Accordingly, based on the label data, the label creating apparatus 3 performs the sequential printing that prints the two types of divided printing images ("SATOH ICHIROH" and "SUZUKI HANAKO") respectively printed for two copies by the sequential printing in a sequence in which the two types of divided printing images are collected. That is, four created labels L are in a sequence of "SATOH ICHIROH", "SUZUKI HANAKO", "SATOH ICHIROH", and "SUZUKI HANAKO" (see FIG. 4B).

Meanwhile, if checking is not performed on the pouring box 43, the sequence image 42 corresponding to the non-sequential printing is displayed on the sequential printing setting area 41 (see FIG. 5A). Further, if the user clicks "OK", the printer driver 13 creates label data so that the label creating apparatus 3 performs non-sequential printing. Further, based on the label data, the label creating apparatus 3 performs the non-sequential printing that prints the two types of divided printing images respectively printed for two copies by the sequential printing in a sequence in which the two same printing images respectively printed for two copies are collected. That is, four created labels L are in a sequence of "SATOH ICHIROH", "SATOH ICHIROH", "SUZUKI HANAKO", and "SUZUKI HANAKO" (see FIG. 5B).

Moreover, the match printing performed by the label creating apparatus 3 is to print a printing image larger than a tape width of the tape-shaped member 5 on the tape-shaped member 5 by dividing the printing image in a tape width direction into a plurality of divided printing images. The user can obtain the label L having a width greater by several times by matching the plurality of labels L on which the divided printing images are printed.

Figure 6:
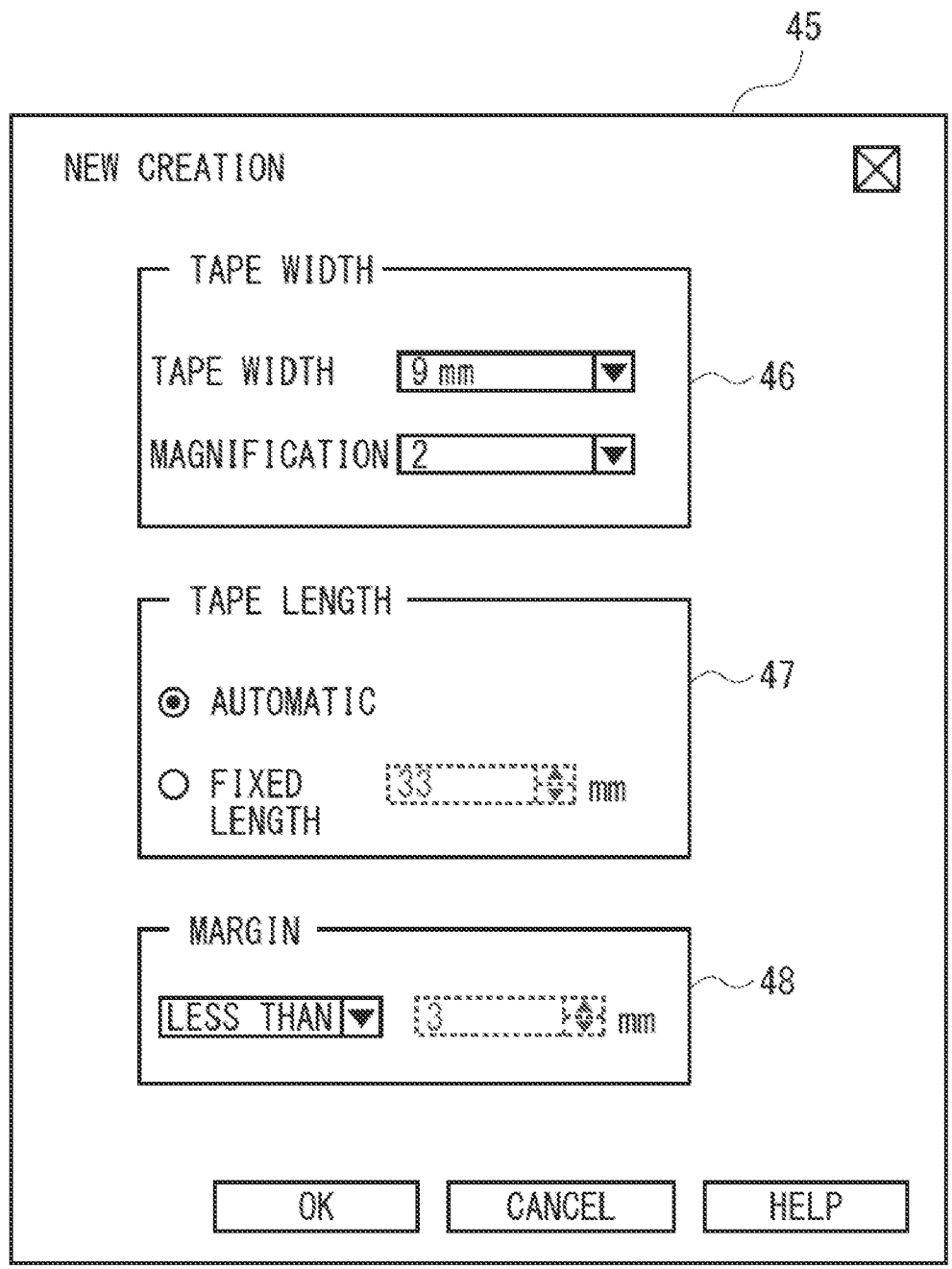
FIG. 6 is a diagram illustrating a new creation screen displayed on the display.
Figure 7A:
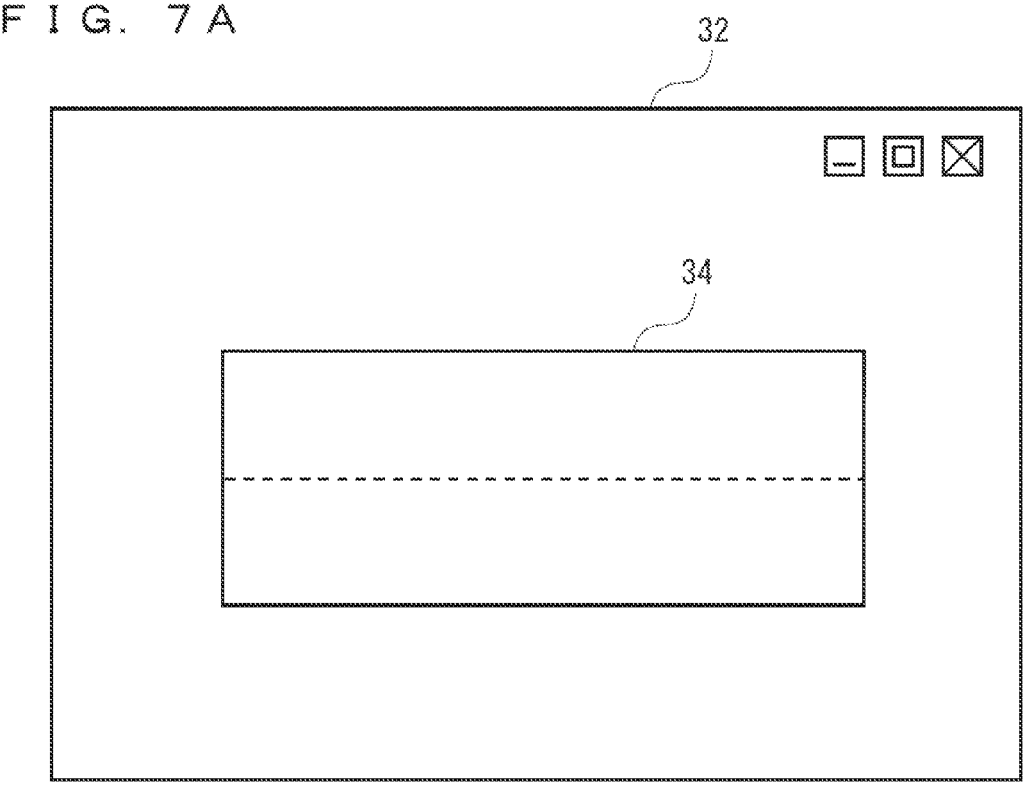
FIGS. 7A and 7B are diagrams illustrating editing screens when match printing is set on the new creation screen.
Figure 7B:
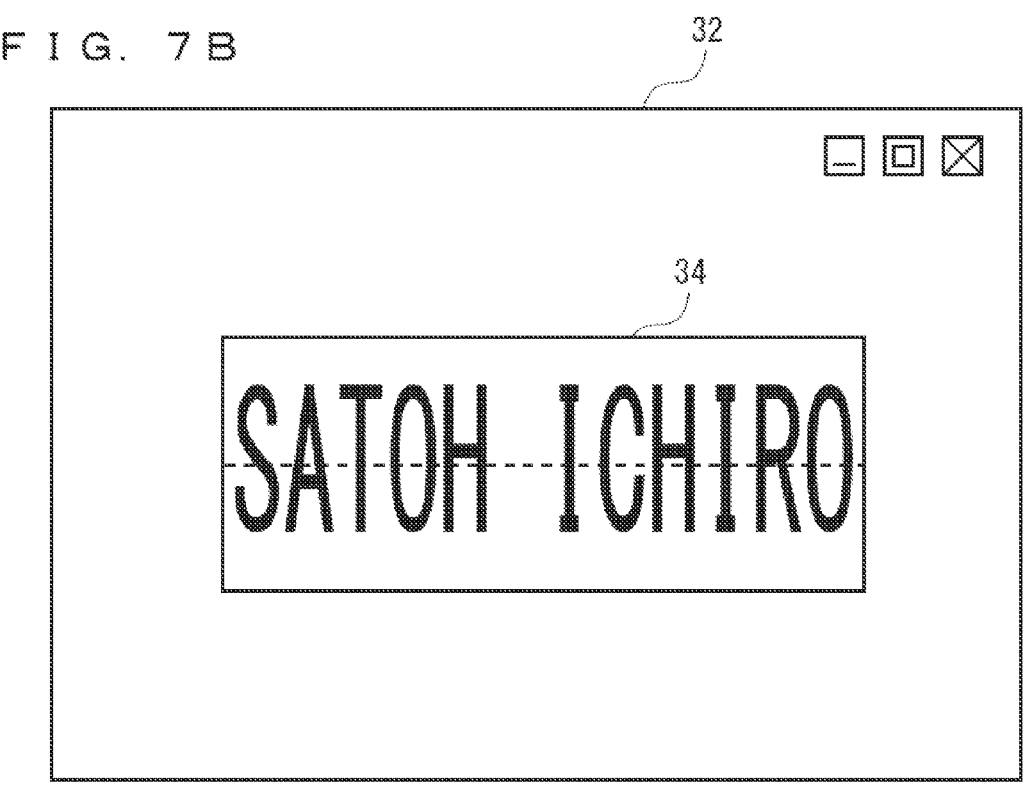
Figure 8A:
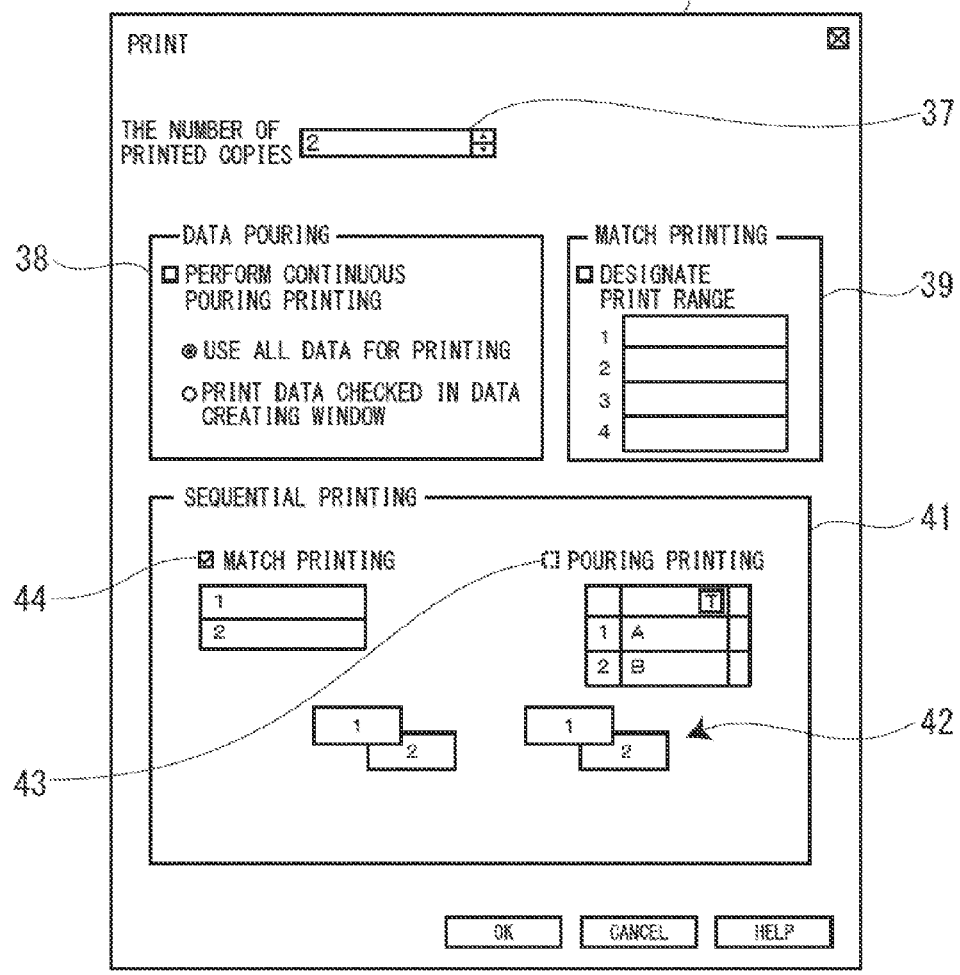
FIG. 8A is a diagram illustrating a state in which sequential match printing is set in a printing dialogue and FIG. 8B is a diagram illustrating a sequence of labels created based on the setting in the printing dialogue.
Figure 8B:
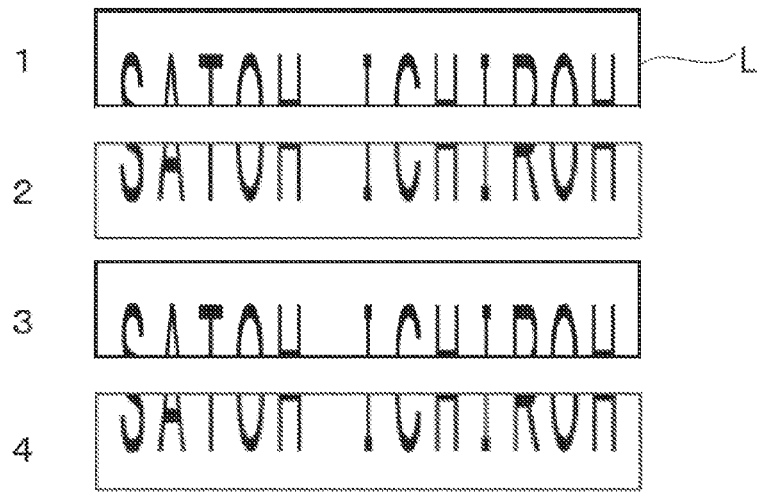
Figure 9A:
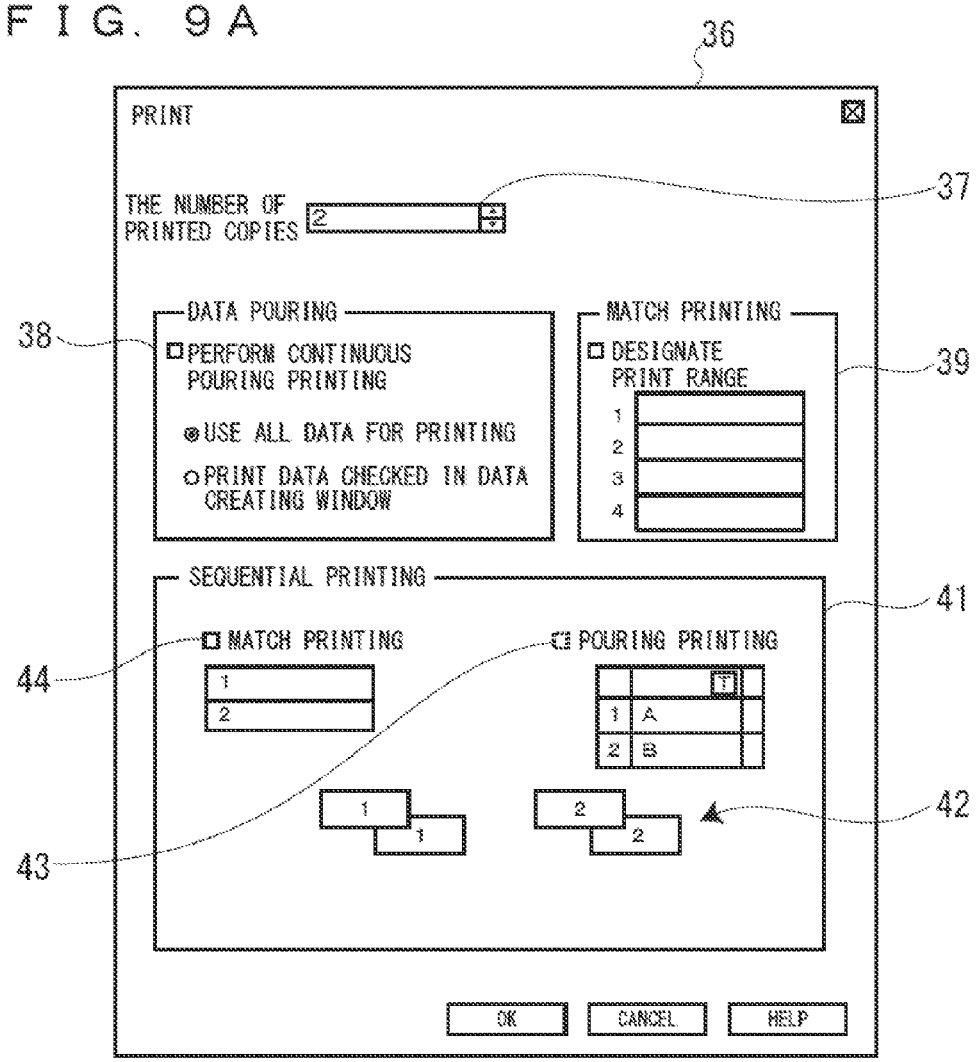
FIG. 9A is a diagram illustrating a state in which non-sequential match printing is set in a printing dialogue and FIG. 9B is a diagram illustrating a sequence of labels created based on the setting in the printing dialogue.
Figure 9B:
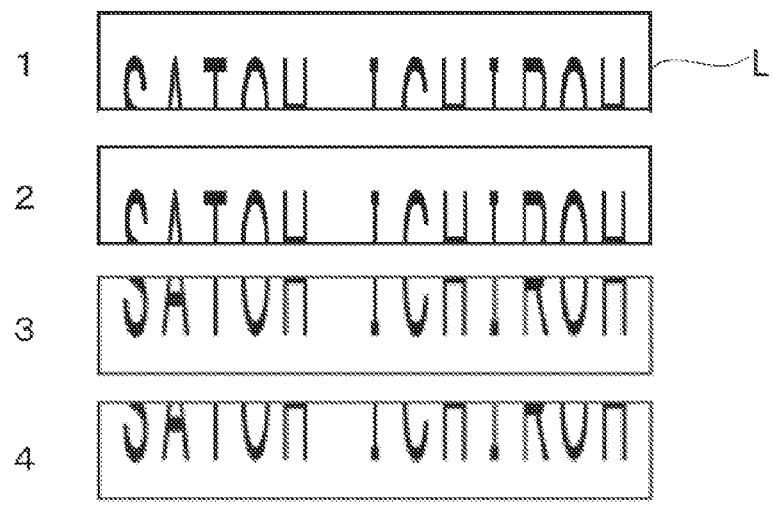

FIG. 6 is a diagram illustrating a new creation screen displayed on the display. FIGS. 7A and 7B are diagrams illustrating editing screens when match printing is set on the new creation screen. FIG. 8A is a diagram illustrating a state in which sequential match printing is set in a printing dialogue. Further, FIG. 8B is a diagram illustrating a sequence of labels created based on the setting in the printing dialogue illustrated in FIG. 8A. FIG. 9A is a diagram illustrating a state in which non-sequential match printing is set in a printing dialogue. Further, FIG. 9B is a diagram illustrating a sequence of labels created based on the setting in the printing dialogue illustrated in FIG. 9A.

With reference to FIGS. 6 to 9B, a case in which the label creating apparatus 3 performs the match printing and a plurality of copies of the respective labels L having a plurality of divided printing images are printed is described in detail. Here, the labels L in which a printing image "SATOH ICHIROH" is divided into two are created for two copies.

First, a new creation screen 45 is displayed on the display 10 of the personal computer 2 based on a predetermined operation from the user (see FIG. 6). The new creation screen 45 includes a tape-width setting area 46 that sets a tape width of the tape-shaped member 5, a tape-length setting area 47 that sets a tape length, and a margin setting area 48 that sets a margin. The user sets a "tape width" and a "magnitude" of the tape-width setting area 46 of the new creation screen 45. In the item of the "magnitude", the number of divided printing images in the tape width direction, that is, the number of sheets of the tape-shaped members 5 desired to be matched is set.

If the user sets the "magnitude" to 2 in the new creation screen 45, and clicks "OK", the display 10 displays the editing screen 32. In the editing screen 32, the label image 34 in which two labels L are matched is displayed based on the set "magnitude" (see FIG. 7A). If the user inputs "SATOH ICHI-ROH", the label image 34 in which the printing image of "SATOH ICHIROH" is divided into two labels L is displayed on the editing screen 32 (see FIG. 7B).

Subsequently, if the user performs a predetermined operation, the display 10 displays the printing dialogue 36. Here, in order to print two copies of the labels L divided into two, the number of printed copies is set to "2" in the number-of-printed-copies setting area 37. If the number of printed copies is set to be equal to or more than "2", the matching box 44 is activated for checking in the sequential printing setting area 41. Additionally, at this point, since the sequential printing is not set, the pouring box 43 is in the grayed-out state.

If the user sets the matching box 44 to be in a checked state, the sequence image 42 corresponding to the sequential match printing is displayed on the sequential printing setting area 41 (see FIG. 8A). Then, if the user clicks "OK", the printer driver 13 creates label data so that the label creating apparatus 3 performs the sequential match printing. Then, based on the label data, the label creating apparatus 3 performs the sequential match printing that prints two divided printing images (upper divided printing image and lower divided printing image) respectively printed for two copies by the match printing in a sequence in which the two divided printing images are collected. That is, the four created labels L are in a sequence of the upper divided printing image, the lower divided printing image, the upper divided printing image, and the lower divided printing image (see FIG. 8B).

Meanwhile, if the matching box 44 is in an unchecked state, the sequence image 42 corresponding to the non-sequential match printing is displayed on the sequential printing setting area 41 (see FIG. 9A). Then, if the user clicks "OK", the printer driver 13 creates label data so that the label creating apparatus 3 performs the non-sequential match printing. Then, based on the label data, the label creating apparatus 3 prints two divided printing images respectively printed for two copies by the match printing in a sequence in which the same divided printing images are collected for two copies. That is, four created labels L are in a sequence of the upper divided image, the upper divided image, the lower divided image, and the lower divided image (see FIG. 9B).

Here, a case in which the label creating apparatus 3 performs the sequential printing and the match printing respectively is described. However, described is a case in which the label creating apparatus 3 performs the sequential printing and the match printing at the same time, and a plurality of the labels L obtained by dividing each of the plural types of printing images into a plurality of divided printing images are created. Hereinafter, based on the information list 31, the sequential printing is performed and also the match printing is performed in which a printing image is divided into two so that two copies of the labels L having two types of printing images each of which are divided into two are created.

In the same manner as above, the user creates the information list 31 in the data creating screen 33 together with setting the "magnitude" to be "2" in the new creation screen 45, and moves the column icon 35 in the information list 31 to the label image 34 displayed in the editing screen 32.

Subsequently, the display 10 displays the printing dialogue 36 based on the predetermined operation from the user. Here, two copies of the labels L in which two types of printing images each are divided into two are created, and the number of printed copies is set to "2" in the number-of-printed-copies setting area 37.

Figure 10A:
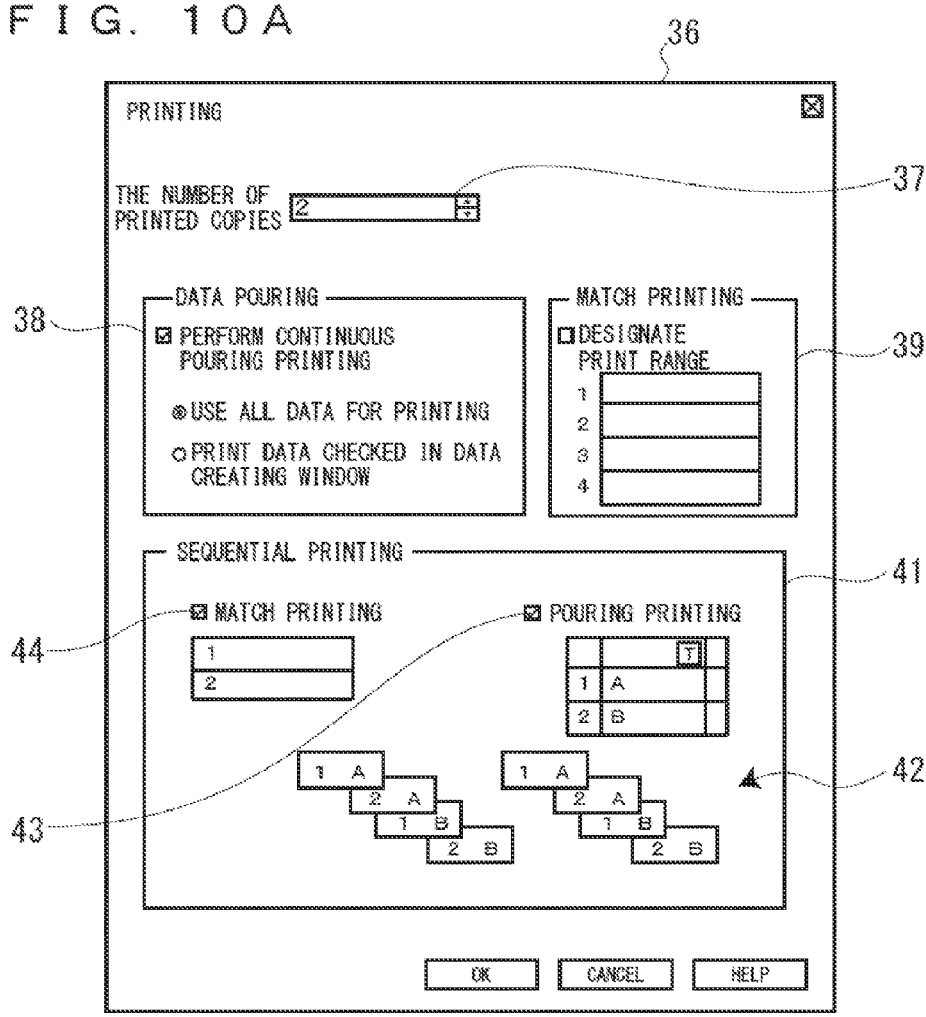
FIG. 10A is a diagram illustrating a state in which the sequential printing and the sequential match printing are set in a printing dialogue and FIG. 10B is a diagram illustrating a sequence of labels created based on the setting in the printing dialogue.

FIG. 10A is a diagram illustrating a state in which the sequential printing and the sequential match printing are set in a printing dialogue. In addition, FIG. 10B is a diagram illustrating a sequence of labels created based on the setting in the printing dialogue illustrated in FIG. 10A.

Figure 10B:
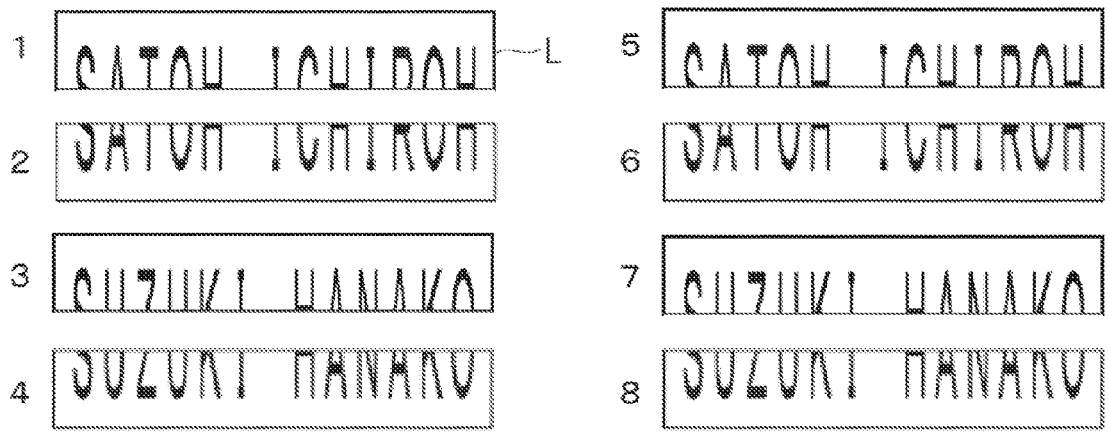

As illustrated in FIGS. 10A and 10B, if the user sets the pouring box 43 to be in a checked state and sets the matching box 44 to be in a checked state, the sequence image 42 corresponding to the sequential printing and the sequential match printing is displayed on the sequential printing setting area 41 (see FIG. 10A). Then, if the user clicks "OK", the printer driver 13 creates label data so that the label creating apparatus 3 performs a first printing process that performs the sequential printing and the sequential match printing. Then, based on the label data, the label creating apparatus 3 performs a first printing process of printing two types of printing images respectively printed for two copies by the sequential printing in a sequence in which the two types of printing images are collected, and printing two divided printing images respectively printed for two copies by the match printing in a sequence in which two divided printing images are collected (see FIG. 10B).

In other words, the printing sequence in the first printing process with respect to a first set (first and second sheets), a second set (third and fourth sheets), a third set (fifth and sixth sheet), and a fourth set (seventh and eighth sheets) of the labels L is in a sequence of "SATOH ICHIROH", "SUZUKI HANAKO", "SATOH ICHIROH", and "SUZUKI HANAKO", and the sequence is identical to the sequence of the sequential printing described above. Further, the first, second, fifth, and sixth labels L on which the same printing image "SATOH ICHIRO" is printed are in the sequence of an upper divided printing image, a lower divided printing image, an upper divided printing image, and a lower divided printing image, and the sequence is identical to the sequence of the match printing. This method is applied in the same manner for the third, fourth, seventh, and eighth set of labels L in which the printing image of "SUZUKI HANAKO" is printed.

Figure 11A:
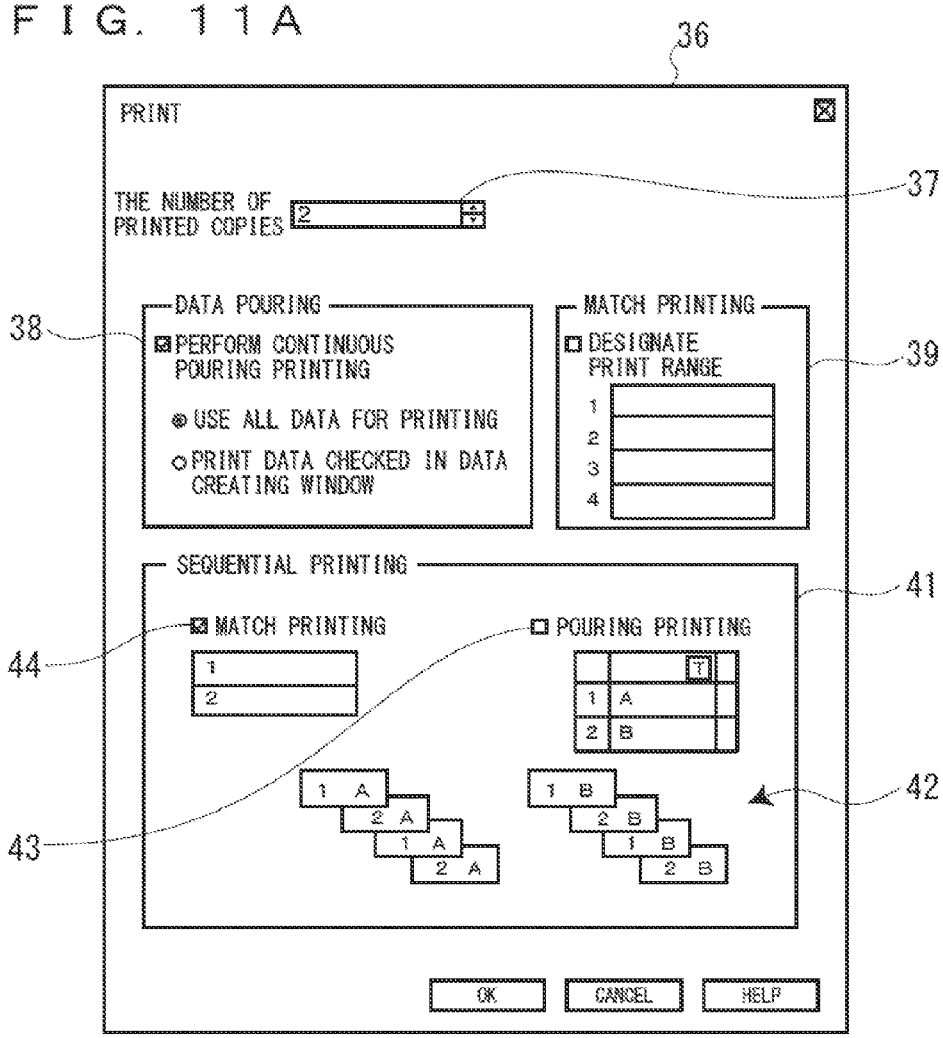
FIG. 11A is a diagram illustrating a state in which the non-sequential printing and the sequential match printing are set in a printing dialogue and FIG. 11B is a diagram illustrating a sequence of labels created based on the setting in the printing dialogue.
Figure 11B:
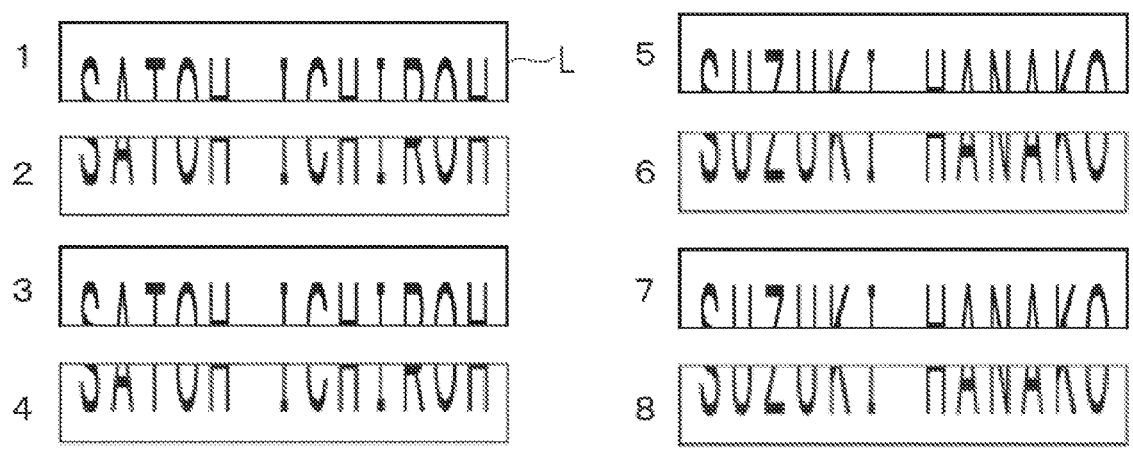

FIG. 11A is a diagram illustrating a state in which the non-sequential printing and the sequential match printing are set in a printing dialogue. FIG. 11B is a diagram illustrating a sequence of the labels created based on the setting in the printing dialogue illustrated in FIG. 11A.

As illustrated in FIGS. 11A and 11B, if the user sets the pouring box 43 to be in an unchecked state and sets the matching box 44 to be in a checked state, the sequence image 42 corresponding to the non-sequential printing and the sequential match printing is displayed on the sequential printing setting area 41 (see FIG. 11A). Then, if the user clicks "OK", the printer driver 13 creates label data so that the label creating apparatus 3 performs a second printing process of performing the non-sequential printing and the sequential match printing. Then, based on the label data, the label creating apparatus 3 performs the second printing process of printing two types of printing images respectively printed for two copies by the sequential printing in a sequence in which the same printing images are collected for two copies, and printing two divided printing images respectively printed for two copies by the match printing in a sequence in which the two divided printing images are collected (see FIG. 11B).

Figure 12A:
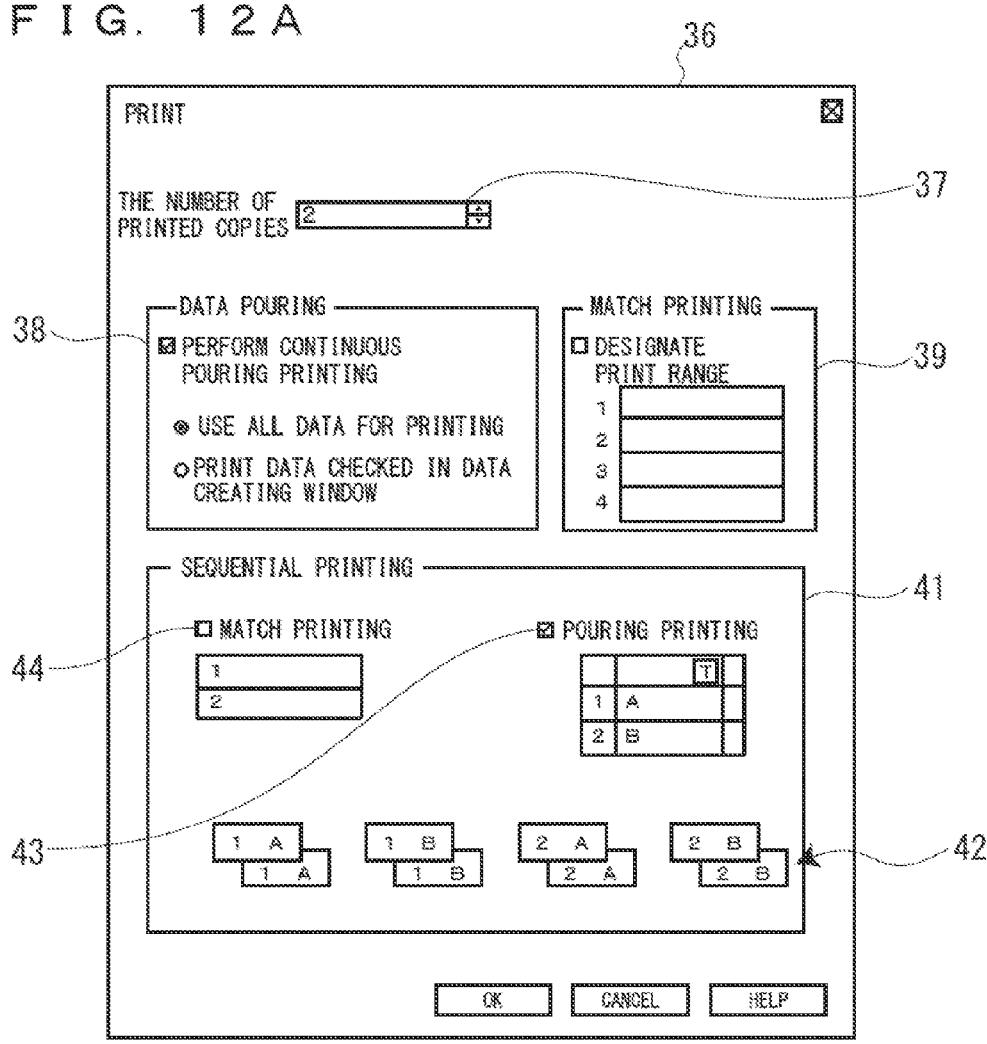
FIG. 12A is a diagram illustrating a state in which the sequential printing and the non-sequential match printing are set in a printing dialogue and FIG. 12B is a diagram illustrating a sequence of labels created based on the setting in the printing dialogue.
Figure 12B:
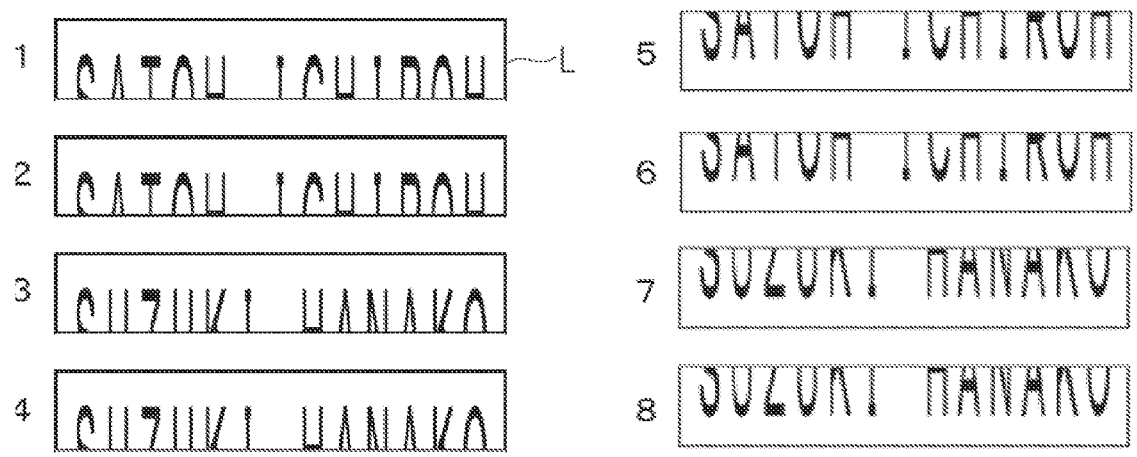

As illustrated in FIGS. 12A and 12B, if the user sets the pouring box 43 to be in a checked state and sets the matching box 44 to be in an unchecked state, the sequence image 42 corresponding to the sequential printing and the non-sequential match printing is displayed on the sequential printing setting area 41 (see FIG. 12A). Then, if the user clicks "OK", the printer driver 13 creates label data so that the label creating apparatus 3 performs a third printing process of performing the sequential printing and the non-sequential match printing. Then, based on the label data, the label creating apparatus 3 performs the third printing process of printing two types of printing images respectively printed for two copies by the sequential printing in a sequence in which the two types of printing images are collected, and printing two divided printing images respectively printed for two copies by the match printing in a sequence in which the same printing images are collected for two copies (see FIG. 12B).

Figure 13A:
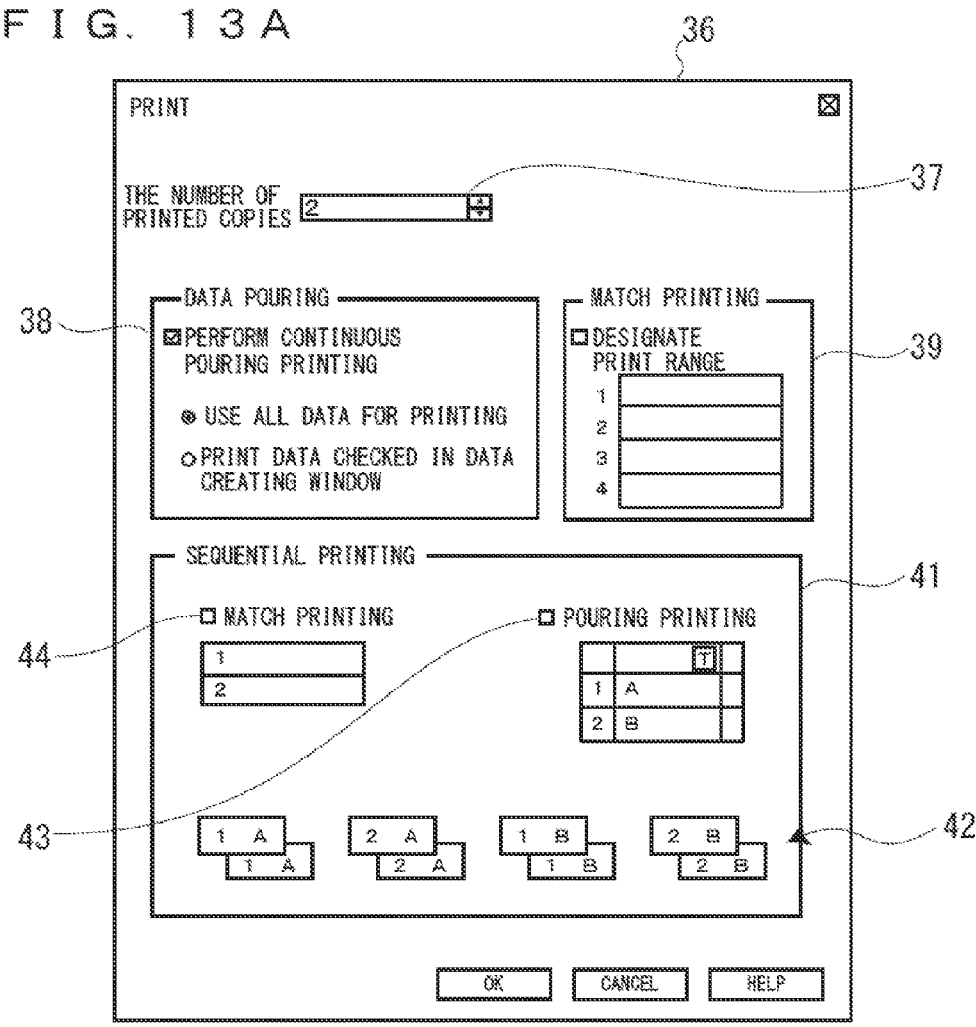
FIG. 13A is a diagram illustrating a state in which the non-sequential printing and the non-sequential match printing are set in a printing dialogue and 13B is a diagram illustrating a sequence of labels created based on the setting in the printing dialogue.

FIG. 13A is a diagram illustrating a state in which the non-sequential printing and the non-sequential match printing are set in the printing dialogue. Further, FIG. 13B is a diagram illustrating a sequence of labels created based on the setting on the printing dialogue illustrated in FIG. 13A.

Figure 13B:
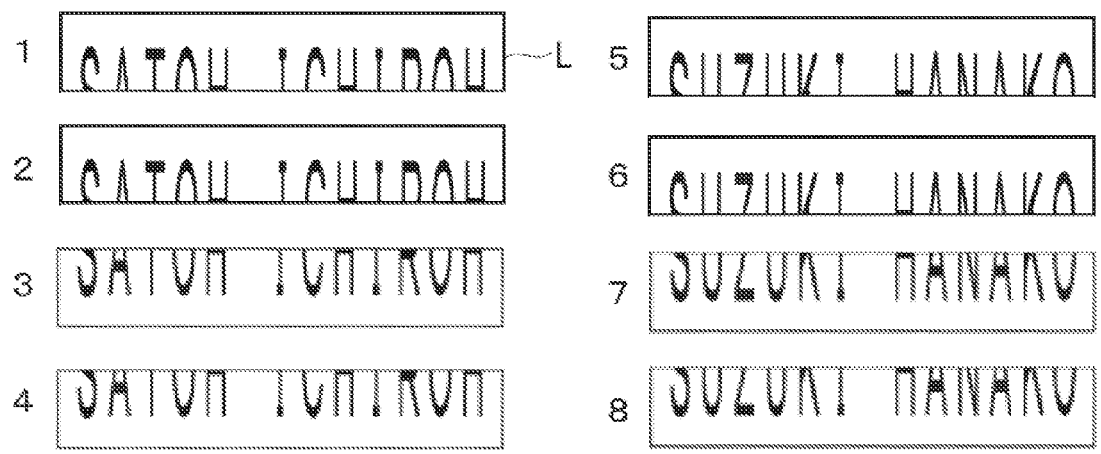

As illustrated in FIGS. 13A and 13B, if the user sets the pouring box 43 to be in an unchecked state and sets the matching box 44 to be in an unchecked state, the sequence image 42 corresponding to the non-sequential printing and the non-sequential match printing is displayed on the sequential printing setting area 41 (see FIG. 13A). Then, if the user clicks "OK", the printer driver 13 creates label data so that the label creating apparatus 3 performs a fourth printing process of performing the non-sequential printing and the non-sequential match printing. Then, based on the label data, the label creating apparatus 3 performs the fourth printing process of printing two types of printing images respectively printed for two copies by the sequential printing in a sequence in which the same printing images are collected for two copies, and printing two divided printing images respectively printed for two copies by the match printing in a sequence in which the same divided printing images each are collected for two copies (see FIG. 13B).

As described above, in the label creating system 1 according to the embodiment, the label data can be created so that the label creating apparatus 3 performs the non-sequential printing of printing a plurality of types of printing images each of which are printed for a plurality of copies in a sequence in which the same printing images are collected for the plurality of copies by the sequential printing. Therefore, the labels L printed by the sequential printing in a sequence in which the same printing images are collected can be obtained. Further, even when the sequential printing is set in the printing dialogue 36 and the match printing is set in the new creation screen 45, the labels printed by the sequential printing in a sequence in which the same printing images are collected can be obtained.

Further, any of the sequential printing and the non-sequential printing is selected by the user in the printing dialogue 36 displayed in the display 10. In addition, the label data is created by selecting any of the sequential match printing and the non-sequential match printing by the user so that the label creating apparatus 3 performs one type of printing process out of four types of printing processes based on the selection result. Therefore, according to the circumstances, the user can select any one of the sequential printing and the non-sequential printing and select any one of the sequential match printing and the non-sequential match printing, and the labels L printed in a sequence corresponding to the selection result can be obtained.

Further, four types of sequence images 42 respectively corresponding to the first to fourth printing processes are selectively displayed on the printing dialogue 36 based on the selection result in the printing dialogue 36. According to this, the user can easily find out in which sequence the labels L are printed according to the selection result in the printing dialogue 36.

In addition, according to the embodiment, the personal computer 2 as a data generating apparatus is provided as an example. However, the invention is not limited to this, and other information processing apparatuses such as a smart phone or a tablet terminal may be used. Additionally, according to the embodiment, a configuration in which the label data generated by the personal computer 2 is transmitted to the label creating apparatus 3 is employed as the label creating system 1. However, the invention is not limited thereto, and the label creating system 1 can be configured by the label creating apparatus 3 that performs an image editing process to a printing/cutting process on a smart phone.

What is claimed is:
1. A label data generating method of generating label data for a label creating apparatus to create a label by printing a printing image on a tape-shaped member based on the label data, the method comprising:
generating the label data in a situation that the label creating apparatus performs sequential printing that prints a plurality of types of printing images based on each item of individual information which is sequentially read from an information list including the plurality of items of individual information, and performs match printing that prints the printing images larger than a tape width of the tape-shaped member on the tape-shaped member by dividing the printing images in a tape width direction into a plurality of divided printing images; and
displaying, in such a manner as to be selectable, whether to perform sequential printing that performs printing in a sequence in which the plurality of types of printing images are collected or to perform non-sequential printing that performs printing in a sequence in which the same printing images are collected for a plurality of copies with respect to the plurality of types of printing images printed for a plurality of copies by the sequential printing, and whether to perform sequential match printing that performs printing in a sequence in which the plurality of divided printing images are collected or to perform non-sequential match printing that performs printing in a sequence in which the same divided printing images are collected for a plurality of copies with respect to the plurality of divided printing images printed for a plurality of copies by the match printing,
wherein, in the generating of the label data, the label data is generated based on the selection result of whether to perform the non-sequential printing or the sequential printing and the selection result of whether to perform the sequential match printing or the non-sequential match printing so that the label creating apparatus performs one printing process of a first printing process that performs the sequential printing and the sequential match printing, a second printing process that performs the non-sequential printing and the sequential match printing, a third printing process that performs the sequential printing and the non-sequential match printing, and a fourth printing process that performs the non-sequential printing and the non-sequential match printing, and
wherein the displaying further includes displaying selectively four types of printing images that respectively correspond to the first, second, third, and fourth printing processes based on the selection result of whether to perform the non-sequential printing or the sequential printing and the selection result of whether to perform the sequential match printing or the non-sequential match printing.

2. A non-transitory computer-readable recording medium that stores a program causing a computer to execute the label data generating method according to claim 1.

3. A label data generating apparatus that generates label data in order to generate a label by printing a printing image on a tape-shaped member based on the label data, the apparatus comprising:
- a data generating unit that generates the label data in a situation that a label creating apparatus performs sequential printing that prints a plurality of types of printing images based on each item of individual information which is sequentially read from an information list including the plurality of items of individual information, and performs match printing that prints the printing images larger than a tape width of the tape-shaped member on the tape-shaped member by dividing the printing images in a tape width direction into a plurality of divided printing images; and
- a display unit that displays, in such a manner as to be selectable, whether to perform sequential printing that performs printing in a sequence in which the plurality of types of printing images are collected or to perform non-sequential printing that performs printing in a sequence in which the same printing images are collected for a plurality of copies with respect to the plurality of types of printing images printed for a plurality of copies by the sequential printing, and whether to perform sequential match printing that performs printing in a sequence in which the plurality of divided printing images are collected or to perform non-sequential match printing that performs printing in a sequence in which the same divided printing images are collected for a plurality of copies with respect to the plurality of divided printing images printed for a plurality of copies by the match printing, wherein the data generating unit generates the label data based on the selection result of whether to perform the non-sequential printing or the sequential printing and the selection result of whether to perform the sequential match printing or the non-sequential match printing so that the label creating apparatus performs one printing process of a first printing process that performs the sequential printing and the sequential match printing, a second printing process that performs the non-sequential printing and the sequential match printing, a third printing process that performs the sequential printing and the non-sequential match printing, and a fourth printing process that performs the non-sequential printing and the non-sequential match printing, and wherein the display unit further displays selectively four types of printing images that respectively correspond to the first, second, third, and fourth printing processes based on the selection result of whether to perform the non-sequential printing or the sequential printing and the selection result of whether to perform the sequential match printing or the non-sequential match printing.

4. A label creating system comprising:
the label data generating apparatus and the label creating apparatus according to claim 3.

\* \* \* \* \*